United States Patent [19]

Ting et al.

[11] Patent Number: 5,131,058

[45] Date of Patent: Jul. 14, 1992

[54] METHOD FOR OBTAINING OUTPUT-ADJUSTED COLOR SEPARATIONS

[75] Inventors: David M. T. Ting, Sudbury; Michael G. Desruisseau, Andover, both of Mass.

[73] Assignee: Eastman Kodak Company, Rochester, N.Y.

[21] Appl. No.: 572,685

[22] Filed: Aug. 24, 1990

[51] Int. Cl.$^5$ .................................................. G06K 9/00
[52] U.S. Cl. ........................................ 382/47; 382/22; 382/56; 358/75
[58] Field of Search ................ 382/21, 22, 55, 56, 382/47; 358/75, 78, 429, 456, 457; 340/731

[56] References Cited

U.S. PATENT DOCUMENTS

| | | | |
|---|---|---|---|
| 4,115,816 | 9/1978 | Moe et al. | 358/75 |
| 4,196,453 | 4/1980 | Warren | 358/283 |
| 4,435,792 | 3/1984 | Bechtolsheim | 365/230 |
| 4,583,116 | 4/1986 | Hennig et al. | 358/75 |
| 4,646,356 | 2/1987 | Anderson et al. | 382/56 |
| 4,651,287 | 3/1987 | Tsao | 358/75 |
| 4,683,492 | 7/1987 | Sugiura et al. | 358/80 |
| 4,794,421 | 12/1988 | Stoudt et al. | 355/3 R |

OTHER PUBLICATIONS

Huang, Coding of Two-Tone Images, IEEE Transactions on Communications, vol. COM-25, No. 11, pp. 1406-1424, 1977.

Holladay, An Optimum Algorithm for Halftone Generation for Displays and Hard Copies, Proceedings of the Society for Information Display, vol. 21, No. 2, pp. 185-192, 1980.

Roetling, Binary Approximations to Continuous Tone Images, Photographic Science and Engineering, vol. 21, No. 2, pp. 60-65 1977.

H. S. Hou, Digital Document Processing (1983) (Chapter Three, Shape Manipulation).

H. S. Hou, Digital Document Processing (1983) (Chapter Four, Digital Halftoning and Shading).

Primary Examiner—Leo H. Boudreau
Attorney, Agent, or Firm—Steven J. Frank

[57] ABSTRACT

A method of adjusting the contours of lineart shapes appearing in bitmap or halftone separations for variations in the mechanical characteristics of printing devices, the color of the separation, and the existence of neighboring lineart shapes. The method involves decomposing the image into discrete lineart shapes, and performing dot-by-dot shifting operations to achieve adjusted shape contours.

10 Claims, 7 Drawing Sheets

METHOD FOR OBTAINING OUTPUT-ADJUSTED COLOR SEPARATIONS

I. BACKGROUND OF THE INVENTION

A. Field of the Invention

The present invention relates to electronic reproduction of images, and in particular to a method of adjusting the contours appearing in bitmap or halftone separations for variations in printing equipment.

B. Description of the Related Art

Traditional methods of representing and storing images for subsequent reproduction on print media involve decomposing the original image into a pattern of monochrome (or "halftone") dots. Although the dots themselves are either black or white, their relative sizes and densities may be varied, thereby enabling simulated reproduction of a gray scale notwithstanding the binary tonality of the individual dots. This approach simplifies the actual printing process considerably.

Color images are usually printed in separate, successive stages of ink application. Each layer of colored ink is applied directly atop the previous stage. This method facilitates use of printing devices having a series of single-color inking stations, each of which makes sequential, registered contact with the substrate.

The number of stages required for complete image rendition depends on the "color model" chosen, the most typical consisting of blue (cyan), magenta, yellow and black ink layers. Accordingly, multicolored images are first separated into a set of monochrome representations, each of which corresponds to the contribution of a particular color to the overall image. These monochrome separations may then be further decomposed into a halftone pattern for printing. Of course, the quality of the ultimate image depends largely on the mechanical precision with which the printer registers the successive ink layers.

Although the manner of converting source images into halftone patterns has undergone significant transformation over the years, the need for these patterns has not disappeared. Modern printing devices continue to employ the same operating principles as their antiquated counterparts. Consequently, while older systems relied upon various photographic screening processes to generate halftone patterns, contemporary devices utilize electronic storage and manipulation techniques to produce a similar end-product.

Systems that store pictorial or other visual information in electronic form generally provide sufficient flexibility to accommodate a variety of data types, including text, characters of various sizes and shapes, graphic (or "line-art") shapes consisting of or bounded by lines, curves or solid areas, as well as continuous-tone photographic images. By using various algorithmic operations, which are now well-characterized in the art, one can resolve these images into color separations and thereafter into halftone patterns.

Images are digitally stored as discrete picture elements, or "pixels", with each pixel corresponding to an identified image point. The entire set of pixels representing an image is referred to as a "bitmap" of the image. While simple monochrome image pixels can consist of single computer-memory bits, each of which indicates whether the corresponding image point is light or dark, color image pixels generally require additional specification information (such as values for hue, color value, and saturation). This additional information may be supplied in a straightforward manner to devices, such as CRT displays, that are capable of directly representing such information.

However, conventional color printing devices can imprint only a unitary dot of a given hue. Accordingly, representing color value and saturation is ordinarily achieved by defining pixels as small image areas, or "cells", that may be filled with varying numbers of colored dots (usually according to a predetermined pattern); because of their sub-pixel size, these dots are referred to as "microdots." If the cells are small enough, the human eye will be unable to resolve the individual microdots therein, while retaining the ability to discern color value and saturation based on the number of microdots per pixel. Pixels can be "shaped" to conform to a contour by eliminating microdots that cross the contour; this truncation operation decreases both the absolute number of microdots and the allowed pixel area, thus retaining the original color density in the affected region. (Note that these microdots are generally much smaller than the halftone dots used in printing.)

Similarly, digital halftone dots are produced by combining a continuous-tone sample image with a digital halftone screen. The screen is made up of periodic cells, each containing a number of microdots. The intensities of sample image points are compared with the threshold level assigned to the cells. If the threshold level of a cell is not exceeded, the cell remains white; otherwise, microdots are "turned on", or set, according to a predetermined pattern. The number of microdots set in a particular cell depends on the intensity of the corresponding sample image point.

Images are typically represented and stored as high-level specifications in a common representational format, e.g. page-description language instructions. In order to be output on a specific device, this data must be converted to a raster pattern suitable for output. A "raster" refers to a regular two-dimensional pattern, divided into a discrete number of positions, that covers the image area. Conversion of the image from a high-level description into a bitmap pattern of microdots, each of which can be "on" (set) or "off" (clear), is referred to as "rasterization" or "raster conversion." For ease of storage and efficiency of transmission, the raster pattern is usually encoded as an ordered list of set and clear microdots rather than as an unordered grid; this ordered list is referred to as a "run-length" specification.

For halftone output, the microdot bitmap can be translated into a halftone pattern by electronic "screening", in which the image pixel pattern is matched against a digital halftone screen made up of periodic cells, with each cell composed of a number of discrete threshold levels. The pixel pattern is compared with the threshold level at each cell position. If the pixel density exceeds the threshold level at a cell position, that position is set; otherwise, it remains off. Halftone dots can be shaped in the same manner as pixels.

In commercial printing applications that involve pictorial images, imperfections associated with the printing process degrade image acuity to an extent sufficient to warrant neglecting the effect of pixel or halftone dot shape; in other words, a unitary pixel shape will not further reduce edge sharpness below the level already inherent in the image as a consequence of the printing process. The same does not hold true for line-art images, however. If pixels or halftone dots that define edge features are not contoured along the edge boundaries, the line-art will appear rough or serrated when printed, producing the appearance that the line-art was sampled at a lower resolution than was actually the case.

Registration errors are also more noticeable in printed line-art images than in continuous-tone images. To compensate for the offset and/or slippage that inevitably accompanies printing with ordinary devices, the rasterized data is frequently subjected to operations that expand the edges in the lighter-colored separations (referred to as "spreading") and contract the edges in darker separations (referred to as "choking"). Practitioners in this field have determined that such an approach offers visually optimal interedge compatibility among neighboring line-art objects.

Unfortunately, if spreading and choking operations are performed merely by scaling, these procedures can themselves introduce unwanted image distortions. For example, if pixels have previously been shaped to conform to edge contours, the shapes may deviate significantly from the new edge contours that result from the spreading and/or choking operations. The visual effect of this mismatch will be to reintroduce the very edge imperfections that were ameliorated by pixel shaping. Another limitation associated with absolute scaling occurs when the contour of the line-art shape forms a narrow channel, such that choking according to the scaling factor creates a "reverse overlap" (as will be discussed below) across opposite edges; the result is a contour distortion rather than an enhancement.

Current methods for performing spreading and choking operations are also limited in that they tend either to apply expansion and contraction factors only to edges that define boundaries between foreground and background, or to treat these boundaries as equivalent to those between overlapping or neighboring objects. Either approach limits the ability of the designer to achieve local control over spreading and choking (i.e., altering the amounts for different parts of the overall image).

II. DESCRIPTION OF THE INVENTION

A. Summary of the Invention

The present invention overcomes these limitations by treating the various line-art components of an image as separate geometric entities, applying a contour-adjustment procedure to each separation of these individual components, and reassembling the components back into a modified version of the original image.

The first step of the method of the present invention involves extraction of discrete line-art components (or, more precisely, the edges of these components) from the bitmap image of each color separation. As used herein, "extraction" refers to deriving a geometric specification of the boundaries of a line-art component ("object") in the coordinate system that defines the bitmap.

In the next step, a contour-adjustment (spread or choke) value chosen by the designer is applied to each of the shapes. The magnitude of this factor depends on the mechanical characteristics of the printing device, the color of the separation to which it is applied, and the existence of neighboring objects. As hereinabove noted, typical applications require spreading of lighter colors and choking of darker ones. Our procedure can accommodate varying degrees of adjustment for different objects, either individually or based on relationships to another object or objects. Furthermore, the method of the present invention permits anticipation and accommodation of narrow object features that would engender reverse overlap if contour-adjustment were accomplished by simple scaling.

The final step of the present invention involves recomposition of the adjusted objects into output-ready bitmaps of the original separations. During reassembly of the components, pixels along object edges are reshaped, as necessary, to conform thereto. Reassembly is accomplished using bit-by-bit logic operations, thereby assuring precise alignment and relationships among objects.

B. Brief Description of the Drawings

The foregoing discussion will be understood more readily from the following detailed description of the invention, when taken in conjunction with the accompanying drawings, in which.

C. DETAILED DESCRIPTION OF THE INVENTION

1. Image Preparation

The present invention operates on a series of individual color separations of line-art image data that are stored as bitmaps or a sequence of instructions in a page-description language ("PDL"). PDL-encoded image data cannot be output directly; it must first be converted into bitmap or run-length form by a raster-image processor ("RIP"), which also governs the manner in which pixels are assembled from individual dots. Typically, the RIP operates on images that have been created at the pixel level (e.g., by an optical scanner in conjunction with software that determines which pixels in the bitmap coordinate space correspond to image points, and must therefore be set, and which remain inactive). The RIP determines the number of microdots per pixel that will be necessary to produce the desired color value for that pixel, and activates the requisite number of microdots in each image pixel according to a predetermined pattern. This results in a microdot bitmap of the image. The present invention is suitable for use at the pixel level or, preferably, at the more detailed microdot level.

The first step of the method of the present invention converts bitmap or page-description language data to a geometric specification of the object. For image data stored in the form of page-description language instructions, these can either first be converted to bitmap form, or retained as lists of ordered vertices that are associated with orientation, scaling and resolution data. In the case of bitmap data (either at the pixel or image dot level), edges are defined by reducing each object to a geometric specification (e.g., an edge list). Spreading or choking may then readily be achieved by changing some parameter of the specification by a predetermined amount (thereby avoiding the need to alter the position of each bit individually).

Suitable geometric specifications can be based on virtually any method of abstractly defining boundaries, such as listing sets of ordered vertices, mathematically defining curves or closed shapes, or combinations thereof. In the preferred embodiment, specifications are generated from the original bitmap representation by a standard edge-following algorithm.

Figure 1:
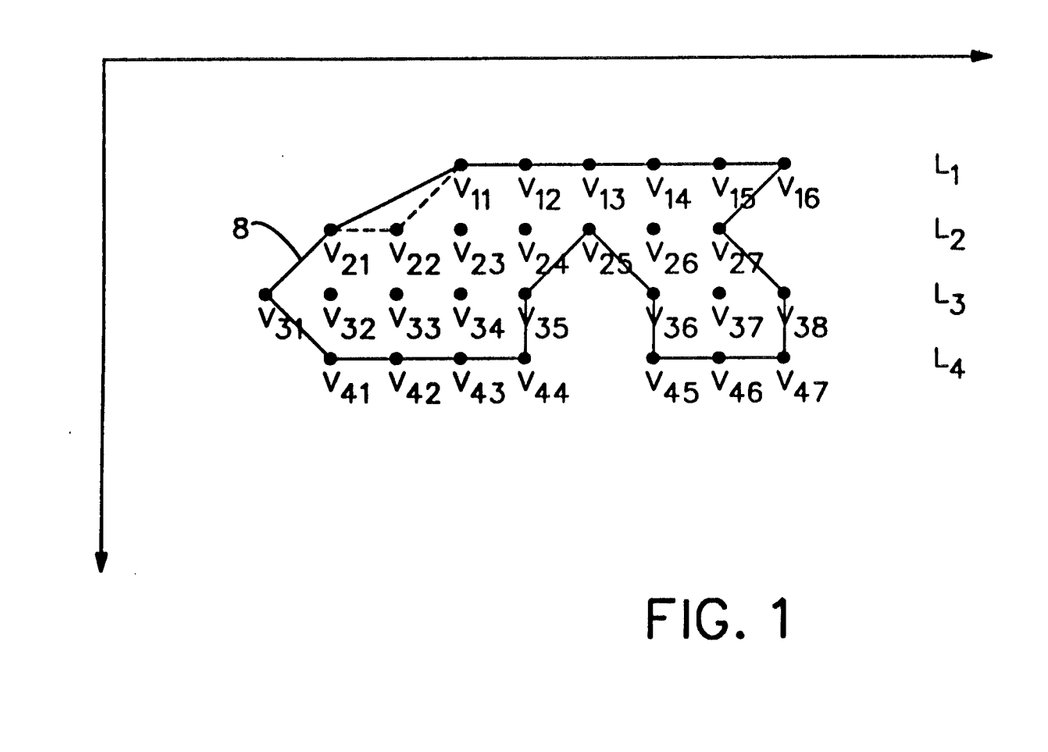
FIG. 1 is a diagram illustrating the operation of an edge-following algorithm suitable for use with the present invention.

Operation of such an algorithm, which converts bitmap information into a closed set of vertices, is depicted in FIG. 1. In the figure, black dots denote bitmap points that have been set. The algorithm consists of the following steps:

1. Scan for the first white-to-black transition and mark the position as the starting point and the first edge point.
2. Scan outward in eight directions (as shown in the inset to FIG. 1) until another black point is found.
3. Approximate the edge as a straight line by joining the edge point with the new black point, which is treated as another edge point.
4. If more than one possible edge point is found, compute approximation error of edge.
5. Select as new edge point the first point producing an edge with approximation error less than a predefined error limit; repeat step 3.
6. If edge point is same as starting point, stop; otherwise, go to step 2.

In FIG. 1, the solid line 8 surrounding the field of bitmap points represents the edge generated by the foregoing method. Application of steps 4 and 5 is illustrated at point $V_{11}$. Scanning outward from point $V_{11}$ results in three candidate edge points: $V_{21}$, $V_{22}$ and $V_{23}$. The approximation error for edge $V_{11}-V_{21}$ is defined as the perpendicular distance between the edge and the next candidate point ($V_{22}$). If this error falls within the tolerable error limit, the edge will join $V_{11}$ and $V_{21}$; if not, the edge will join $V_{11}$ and $V_{22}$, which will itself ultimately be joined to $V_{21}$.

For rectilinear shapes, the algorithm returns ordered sets of vertices in known directions which describe the closed areas and any embedded holes. However, the algorithm is not limited to straight-line segments, and can be modified to produce rounded instead of straight edges by substituting curve-fitting steps for the edge-definition steps 3 and 5. For example, a bitmap of the annular object denoted by reference numeral 9 in FIG. 3 would consist of the set of pixels, ordered in a two-dimensional array, that define the object. On the basis of this list, the edge-following algorithm returns equations approximately representative of the curvatures of the contours 10 and 12. The degree of the allowed approximation determines the fidelity of the derived specification to the original input. However, the input itself may include minor deviations due, for example, to imperfections in the scanning process. Use of a positive error limit, which permits the generated curves to "regularize" the edges, can therefore produce edges that are both more accurate and more visually appealing. Naturally, the amount of regularizing depends on the degree of approximation.

Figure 2:
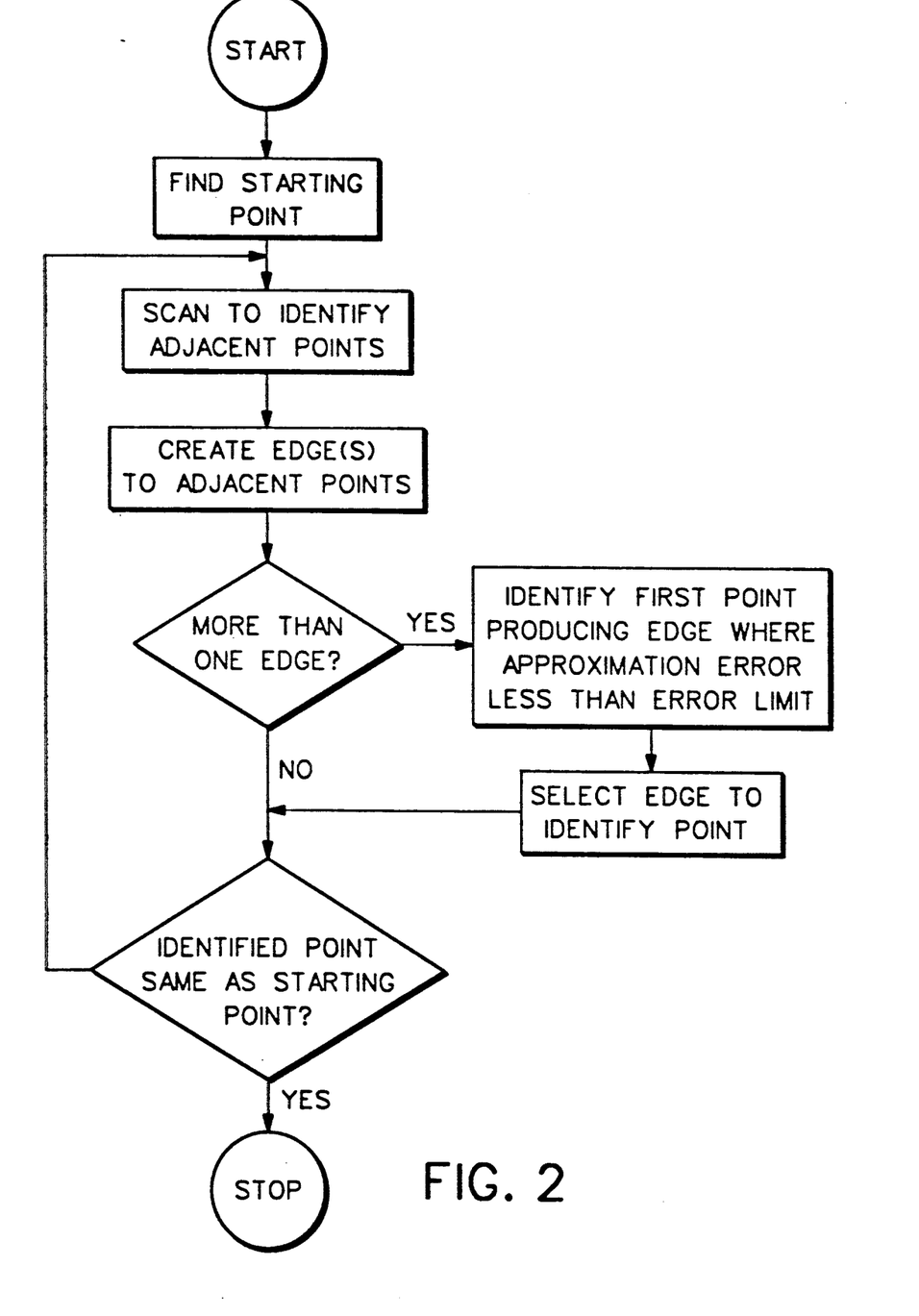
FIG. 2 is a flowchart depicting operation of an edge-following algorithm suitable for use with the present invention.

This procedure is diagrammed in flowchart form in FIG. 2.

In this fashion, each object from each color separation receives a geometric specification, the contours of which can be smooth or detailed depending on the chosen approximation error. The specifications of objects from different color separations are then compared to identify adjacent or overlying edges. These edges or the relevant portions thereof are stored in a separate table, along with an identifier that specifies the object from which it was drawn.

2. Contour Adjustment

The next step is to perform the necessary contour adjustments on each object. The user specifies a "presumptive" global spread or choke amount that applies to entire objects, the magnitude of which depends on the degree of anticipated mechanical slippage and the color of the separation from which the object is drawn. The user may also specify deviations (referred to as "variation parameters") from this presumptive amount for objects that overlie or directly neighbor adjacent objects or background areas, the amount of deviation depending on the character and degree of overlap. For example, in the case of a yellow object, the deviation may be greater for edges that overlie a black object than for edges that overlie a magenta object.

The spreading or choking procedure can be implemented in either of two ways. In one embodiment, the geometric specification of each object is converted into a list of points at output resolution. The slope of the tangent to the object contour at each point (based on its geometric specification) is also calculated and associated with that point. Along contour lengths for which the contour-adjustment value is constant, the position of each point is then either extended outward relative to the enclosed area (the in the case of spreading) or contracted inward relative to the closed area (in the case of choking) by the contour-adjustment value along a line passing through the point and perpendicular to the point's tangent line. The new point positions are stored as they are calculated.

Figure 4A:
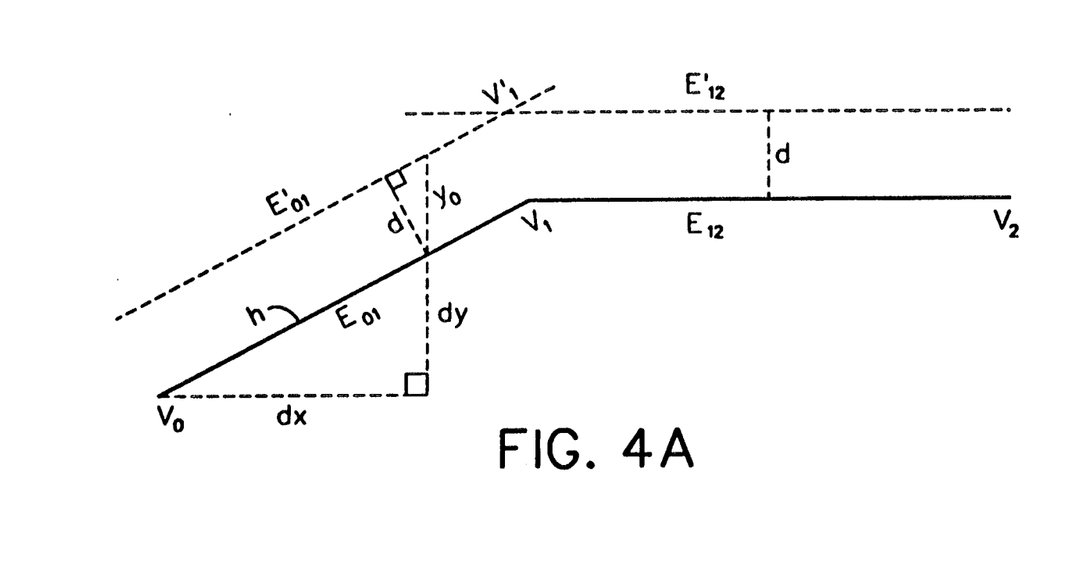
FIGS. 4A and 4B are diagrams that depict a mathematical implementation of of first embodiment.

This process can be represented mathematically as follows. Refer to FIG. 4A, which depicts two connected edges, $E_{01}$ and $E_{12}$, which join vertices $V_0$, $V_1$ and $V_2$. To spread the two edges by a fixed amount, d, to create new edges $E_{01}'$ and $E_{12}'$, equations for the original edges are derived and subjected to displacement.

Equations representative of edges E01 and E12 are as follows:

$$E_0: y=(x-V_{1x})(V_{0y}-V_{1y})/(V_{0x}-V_{1x})$$

$$E_1: y=k$$

where $V_{nx}$ and $V_{ny}$ denote the x and y coordinates, respectively, for vertex $V_n$, and k is a constant.

To achieve a displacement d, the equation for edge $E_0$ must be vertically displaced by an amount $y_0$. This value can be computed by constructing a similar triangle with edges dx, dy and h, where h is a section of edge $E_0$ and is equal to $(dx^2+dy^2)^{\frac{1}{2}}$. By geometric identity, $y=(d)(h)/dx$; alternatively, $y=d(x^2+y^2)^{\frac{1}{2}}/dx$. For edge $E_1$, which is horizontal, the y coordinate is simply displaced vertically by d. The new equations for $E_0$ and $E_1$ are then:

$$E_0: y=(x-V_{1x})(V_{0y}-V_{1y})/(V_{0x}-V_{1x})+y_0$$

$E_1: y = k + d$

Figure 4B:
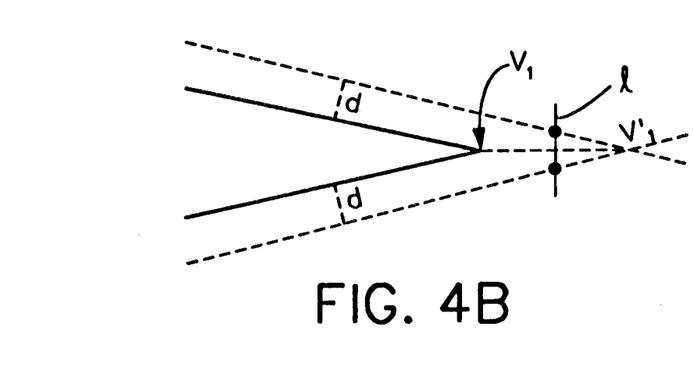

If the angle between the spread edges is too acute, the resulting corner may extend well beyond the original vertex. This produces an unwanted "spur". The effect is illustrated in FIG. 4B, in which the angle between edges has been reduced. Accordingly, it is necessary to compute the distance between points $V_1$ and $V_1'$, to verify that this distance falls within an allowed limit (usually a multiple of the displacement, d). If this limit is exceeded, the edge is beveled by introducing a normal (labeled as 1 in FIG. 4B) to the line connecting $V_1$ and $V_1'$ at the allowed distance from $V_1$. Two new vertices are generated where the normal crosses the projected edges, and the spread shape is truncated at the edge defined by the normal, 1.

Once again, the mathematical operations can be straightforwardly modified for use with curved shapes.

The foregoing procedure is modified for adjacent and overlying edges (assuming the user has defined a different contour-adjustment value for such edges). For these edges, which are identified by reference to the table of locations created during image preparation, the magnitude of the contour-adjustment value is altered according to the variation parameters.

Figure 3:
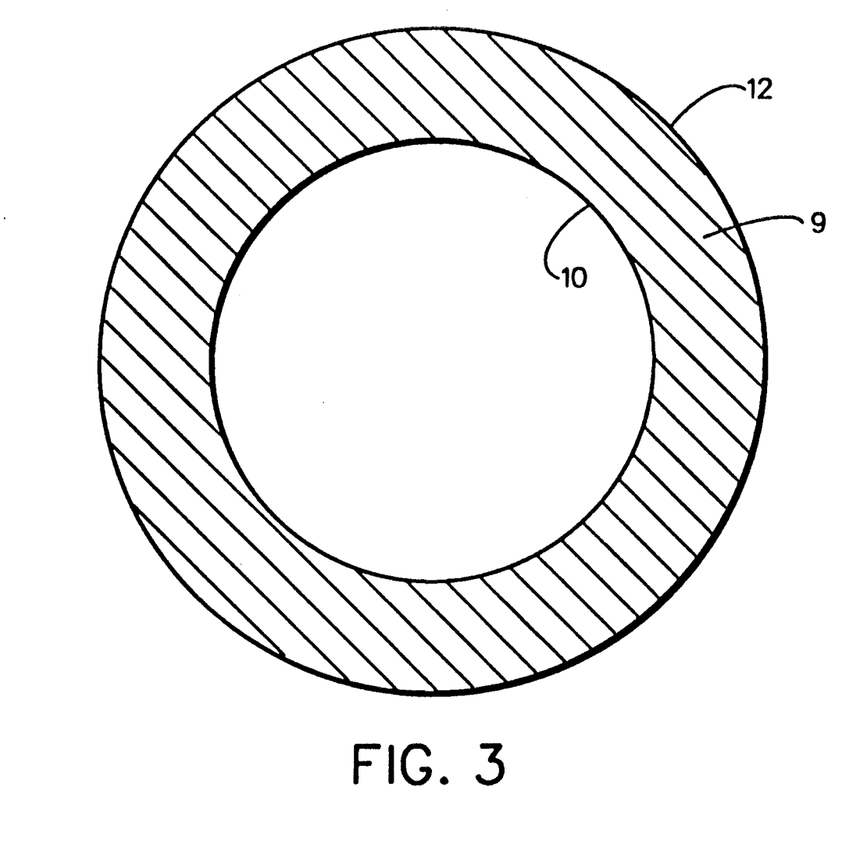
FIG. 3 illustrates an example of a line-art object.
Figure 5:
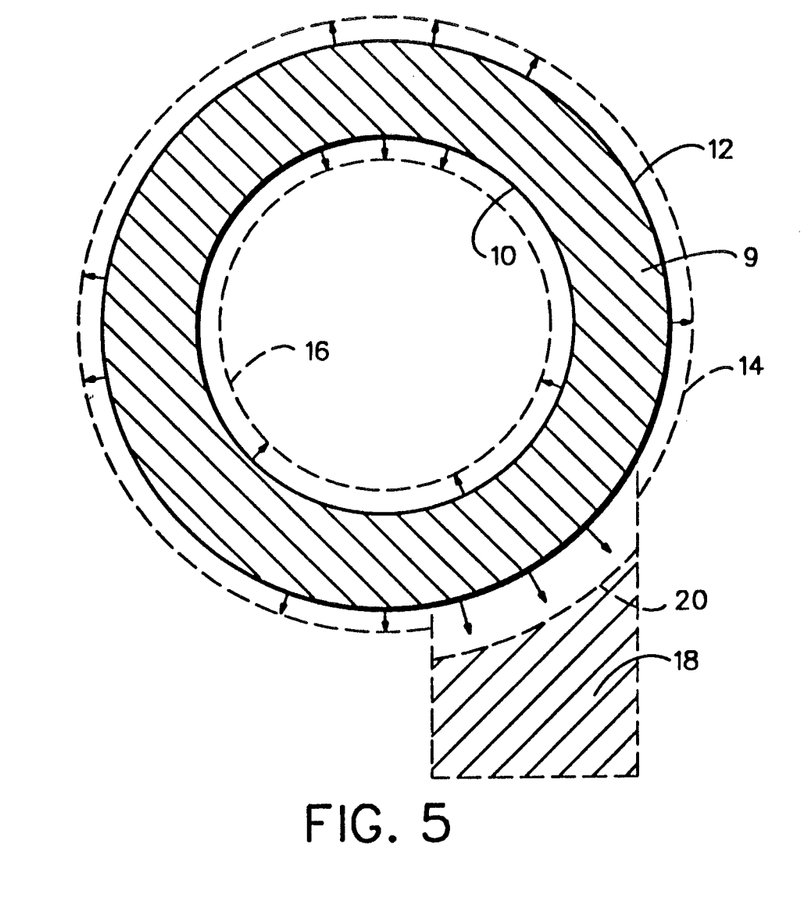
FIG. 5 shows the manner in which one embodiment of the present invention may be applied to the line-art object depicted in FIG. 3.

The results of this process are further depicted in FIG. 5, which illustrates the effect of a spread operation on the object illustrated in FIG. 3. Most of the points along original contour 12 are expanded by the contour-adjustment value to new positions along an adjusted contour 14. Similarly, points along original contour 10 are expanded (relative to the closed area) to positions along new contour 16. The block represented in phantom and denoted by reference numeral 18 represents an underlying object of a different color (and which would therefore appear on a different separation). For purposes of this illustration, assume that the overlap of object 9 over object 18 requires that object 9 be given a larger spread for the overlap area relative to the spread that is required for non-overlap area. Accordingly, the portion of edge 12 that overlies object 18 receives a greater adjustment than the remainder of edge 12, resulting in a broader adjusted contour 20.

The new contour must now be filled with color to conform to the appearance of the original object. For this purpose, the adjusted contour is rasterized and used as a mask that is applied directly to a bitmap of the original object, in the case of choking, or to a color-surface bitmap that is slightly larger than the original object, in the case of spreading. For a monochromatic object, this latter bitmap is produced merely by extending the bitmap of the original object in all directions, e.g. by defining a bounding box having dimensions larger than the original object, which encloses a grid of pixels having characteristics identical with those of the original object. If the color of the original object is non-uniform (e.g., a two-color gradient), the same procedure that was used to color the original object is carried out on the bounding box to produce the color-surface bitmap.

The mask is "applied" to the bitmap of the original object or the bounding box using logical AND operations between points on the bitmap and points specified by the mask. The resulting image represents the final output object. Because the AND operation is preferably performed at the microdot level rather than the pixel level, the borders of the output objects are fine-grained.

Figure 6:
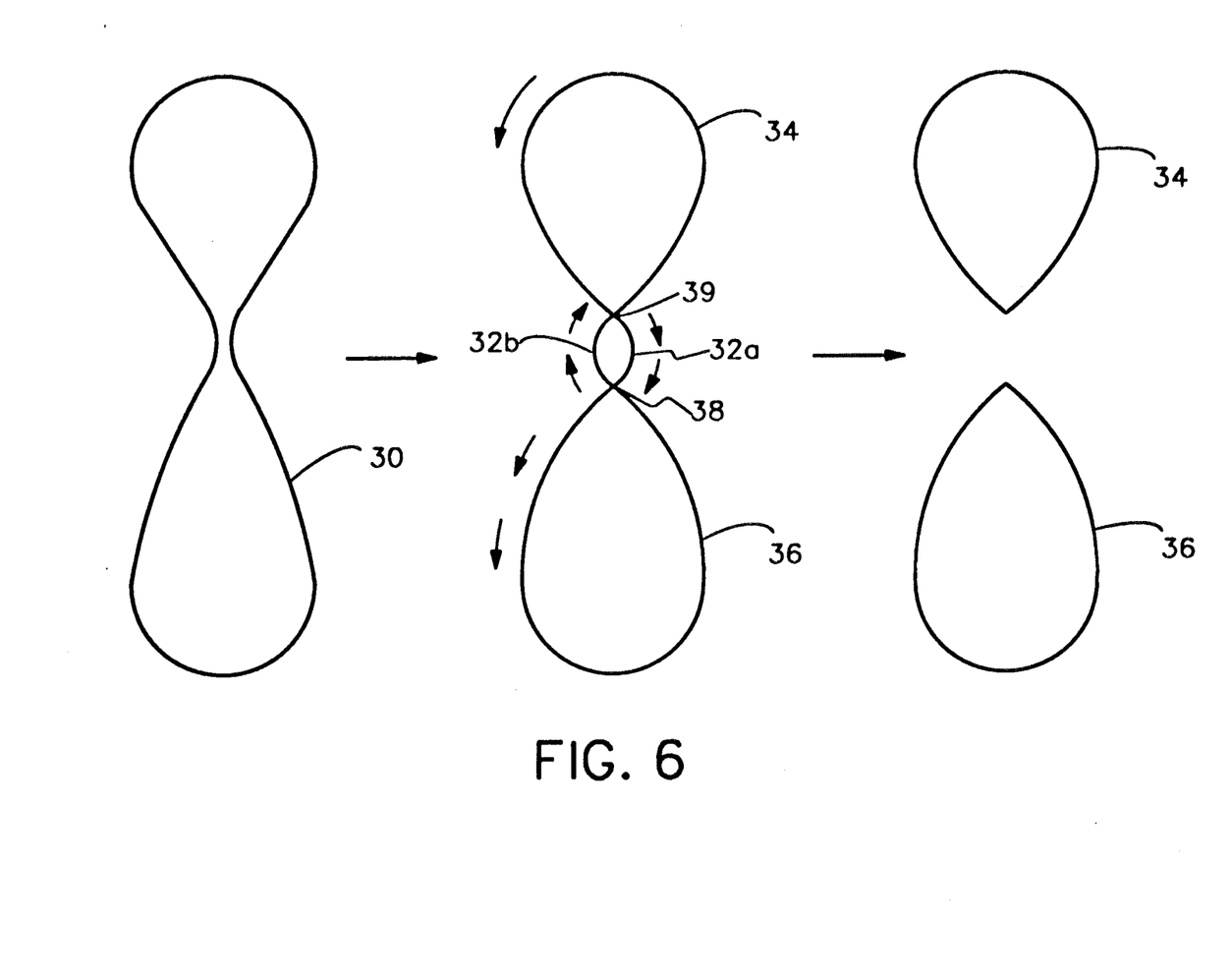
FIG. 6 exemplifies the way in which choking the border of a line-art object can result in reverse overlap, and the manner in which the present invention overcomes this difficulty; an FIG. 7 illustrates the manner in which the second embodiment of the present invention may be applied to the line-art object depicted in FIG. 2.

An additional modification is needed where the inward contraction (or expansion, in the case of an enclosed boundary such as edge 10) would result in reverse overlap. This situation is illustrated in FIG. 6. When edge 30 of the depicted object is choked inward by a sufficient amount, reverse overlap of a portion of the new contour results in the formation of three distinct geometric regions, bounded by edges 32a, 32b, 34 and 36. The method of the present invention calls for elimination of the overlap region bounded by edges 32a and 32b, while preserving the remaining regions bounded by edges 34 and 36 as a pair of disjoint objects.

Identification of overlap regions is accomplished using an edge-following method, which is applied to the edges of all choked objects. Beginning, for example, with a point on edge 34, a series of successive points on this contour is identified along a chosen direction until an intersection with another edge (i.e., point 39) is reached. Further points along the new edge 32 (continuing along the direction established by the previous edge) are defined until a closed loop is established. Completion of the loop requires deviation from the direction of edge 32a at the next intersection (i.e., point 38) so as to proceed along edge 32b. If the direction of point identification for the closed loop differs from that of original, pre-intersection edge 34, the points on and within the closed loop are discarded. This procedure is continued from point 38 along edge 36, in the direction traversed along edge 32a in the previous loop. The result is retention only of the regions bounded by edges 34 and 36.

The second embodiment dispenses with the need for mathematical manipulation of the positions of each original contour point. In this approach, the new contour is defined by superimposition of a series of smooth, symmetrical deletion or expansion areas along the original edge at each rasterized point. The radii of these areas correspond to the desired contour-adjustment value, which is itself based on a target output resolution.

Figure 7:
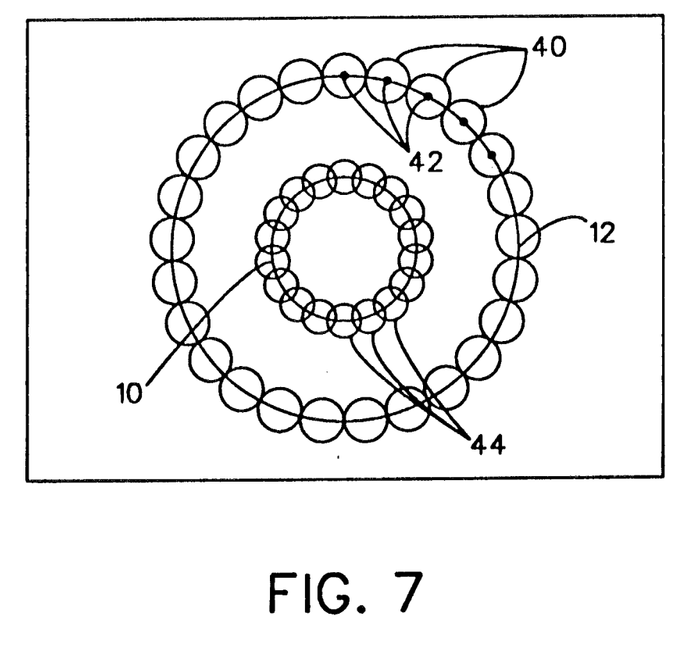

The effect of this procedure is shown in FIG. 7. A series of circles 40 is placed around original outer contour 12, and another series 44 around original inner contour 10. The size and spacing of the circles depends on the degree of accuracy required for the adjusted contour, balanced against the amount of computing time that can be devoted to contour definition.

The new edge is defined by the union of all relevant arc segments lying between points of intersection. In the case of spreading, the relevant arc segments lie outside the original contour; for choking, the relevant segments lie inside.

In the example depicted in FIG. 7, the centers 42 of circles 40 have been chosen such that the circles lie tangent to one another along contour 12. This produces the roughest adjusted contour for circles of a given size, because the new contour will correspond either to the union of the outer semicircular arcs of each circle (in the case of spreading) or the inner semicircular arcs (in the case of choking). By contrast, circles 44, which surround contour 10, are both smaller than circles 40 and overlap one another. These variations in required resolution could stem, for example, from differences in the color of the background areas abutting contours 10 and 12. It is also possible to use shapes other than circles (e.g., ellipses) for the deletion/expansion elements.

The new contour is applied to the original object or the bounding box as described above in connection with the first embodiment, preferably at the microdot level.

The spread or choked object is established by clearing all microdots within the deletion areas (in the case of a choke operation) or setting all points within the expansion areas (in the case of a spread operation). Spread objects are applied to a bounding box to introduce color. The problem of reverse overlap does not occur with this embodiment, because the total amount of deleted area remains unaffected by overlap among deletion areas.

3. Reintegration of Elements

The result of applying the contour-adjustment steps described above is a set of modified, or "brushed", line-art objects, with each object consisting of a set of individually brushed color separations ("object separations"). These must now be combined with one another to produce separation masks.

For each color of the color model, successive bit-by-bit logical OR operations ar first performed between the bitmaps of all object separations of the selected color and a blank mask, to produce a global separation mask containing a clear area or areas corresponding to the complete set of brushed object separations.

A second step is performed for objects that overlie other objects. In such cases, all object separations of overlying objects are applied, using successive bit-by-bit logical OR operations, to each global separation mask in order to clear the underlying image areas and prevent unwanted color from being laid down during printing.

The global separation masks may be uniform pixel fields or halftone screens. If the OR operations were performed at the pixel or halftone-dot level, instead of the microdot level, the individual objects must be reintroduced into the separations at the microdot level using logical AND operations in order t ensure proper clefting of the pixels or halftone dots. The resulting pre-press separation masks can be output to platemaking or other output devices for printing or viewing.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of adjusting the contours of line-art shapes stored as bitmap representations, comprising the steps of:
    a. generating geometric specifications for the edges of each line-art shape, and which define the boundaries of the shape;
    b. modifying the specifications in a manner representative of expansion or contraction of the lengths of the corresponding edges by a predetermined amount, thereby producing modified specifications representative of adjusted edges; and
    c. performing point-by-point logic operations between points within and including the adjusted edges as specified in the modified specifications and points on a separate bitmap.

2. The method of claim 1 wherein the predetermined expansion or contraction amount is determined by characteristics of an output device.

3. The method of claim 2 wherein the predetermined expansion or contraction amount for each shape is further determined by its color.

4. The method of claim 1 further comprising the step of storing data for each edge indicative of whether the edge overlies or lies adjacent to another line-art shape.

5. The method of claim 4 wherein the predetermined expansion or contraction amount for each edge is determined by characteristics of an output device, the color of the shape bounded by the edge and whether the edge overlies or lies adjacent to another line-art shape.

6. The method of claim 1 wherein the step of expanding or contracting comprises the substeps of:
    a. converting the geometric specifications of each line-art shape into a list of bitmap points; and
    b. for each listed point, extending its position outward or contracting it inward by the predetermined amount, along a line perpendicular to the edge at such point.

7. The method of claim 1 wherein the step of expanding or contracting comprises, for each edge, the substeps of:
    a. superimposing along the edge a series of smooth, symmetrical shapes, the radii of which correspond to a predetermined value, and the shapes being disposed so as to intersect one another to produce a continuous series of arc sections outside the edge and a continuous series of arc sections inside the edge; and
    b. depending on whether the edge is to be expanded or contracted, defining a new edge as the union of the arc sections either outside or inside the edge.

8. The method of claim 1 wherein the steps are performed separately on each line-art shape, and further comprising the step of integrating the adjusted shapes using successive point-by-point logical OR operations.

9. The method of claim 8 wherein each point corresponds to a microdot.

10. The method of claim 1 wherein each point corresponds to a microdot and the logical operations are AND operations.

* * * * *